July 12, 1966  J. W. MELVILLE ET AL  3,260,455
STEPPED COUNTING APPARATUS

Filed Sept. 30, 1964  5 Sheets-Sheet 1

INVENTORS
JOHN W. MELVILLE
ROBERT F. OSBORNE
JOHN F. WIRLEY
BY

ATTORNEYS

INVENTORS
JOHN W. MELVILLE
ROBERT F. OSBORNE
JOHN F. WIRLEY
BY
ATTORNEYS

INVENTORS
JOHN W. MELVILLE
ROBERT F. OSBORNE
JOHN F. WIRLEY
ATTORNEYS

INVENTORS
JOHN W. MELVILLE
ROBERT F. OSBORNE
JOHN F. WIRLEY
BY
ATTORNEYS

United States Patent Office 3,260,455
Patented July 12, 1966

3,260,455
STEPPED COUNTING APPARATUS
John W. Melville, Robert F. Osborne, and John F. Wirley, Webster, N.Y., assignors to Xerox Corporation, Rochester, N.Y., a corporation of New York
Filed Sept. 30, 1964, Ser. No. 400,315
6 Claims. (Cl. 235—132)

This invention relates to control apparatus and specifically to a control computer used to record the occurrence of events in terms dependent on the number of previous events and to control associated apparatus in accordance with predetermined settings in the computer.

More particularly, the present invention serves the purpose of a programmer, a computer, and a counter and performs the various functions generally associated with each of these items. It is a programmer or a controller in the sense that predetermined numbers of occurrences of events may be controlled in associated apparatus. It is a counter in that it records the occurrence of events, and gives a visual indication of the number of events that have transpired, and it is a computer or recorder in that it records the occurrence of events according to a preset weighted scale dependent on the number of previous events that have occurred. The present invention may be used to control and count any type of event; but for purposes of illustration herein, it will be considered as controlling process machinery and the events that occur therein. For example, the present invention may be associated with a xerographic reproducing machine of the type disclosed in Patent No. 3,062,109, wherein the events to be controlled and counted would be the number of copies reproduced from a single original.

Providing controls or programs which vary with the occurrence of events necessitates a variable output signal or pulse that can be regulated as events occur. The variable number of pulses can be used to serve any desired purposes and regulation of the pulse output established or changed according to preset patterns. For example, in various process machinery it is necessary to calculate the cost per cycle of the machinery at various rates, depending on the number of cycles of machine operation or what is commonly called a stepped rate. For example, in xerographic reproducing machines of the type disclosed in the above cited Patent No. 3,062,109 wherein multiple copies may be reproduced from a single original, it is desirable to be able to vary the rate at which a customer is charged depending upon the number of multiple copies made from a single original. In the office copying art and the printing art generally, the cost to a customer for each copy produced generally decreases with the number of copies to be made in a single run on the machinery involved. For example, in lithography the cost per copy when fifty copies are made is greater than the cost per copy when 1,000 or 2,000 copies are to be made. In office copying, machines capable of reproducing multiple copies of original documents are frequently leased to a customer and operated on the customer's premises under the customer's control with the leasing rate being determined by the number of copies produced on the leased equipment. However, as in lithography, it is desirable to vary the rate per copy reproduced when large runs are made from a single original. In conventional equipment the number of copies run on the machine is indicated in absolute values on a counter on the machine and with a fixed charge per copy or a charge stepped according to the total number of copies run on the machine. These charges to the customer may be computed manually. However, when the rate is to be varied or stepped in each run of the machine depending on the cycles of operation during that run, then a simple counter would be insufficient. Applicant's recorder or control computer presents the number of copies to be made in each run of the machine, indicates each cycle of the machine as it occurs, records a cumulative reading of a number indicative of the number of cycles run on the machine stepped according to the number of cycles in each run and turns off the machine after the programmed number of cycles have been completed. The machine under the control of the computer or programmer is referred to herein as associated apparatus.

It is therefore the primary object of this invention to control, count, and indicate according to a stepped rate, the occurrence of events.

It is a further object of this invention to step a series of output pulses in a preset adjustable pattern according to the occurrence of previous events. It is a further object of this invention to record the occurrence of events with each event weighted by a fact or as determined by the occurrence of previous events and to control the number of occurrences of events according to a preset program.

It is also an object of this invention to improve control apparatus, to count the cycles of operation of an associated apparatus, to record the cycles of operation of the associated apparatus as a function of the number of cycles in a run on the apparatus and to control the operation of the associated apparatus ccording to a preset program.

These and other objects of this invention are attained by means of a control computer or recorder for use in conjunction with a piece of associated apparatus, having means to emit a sequential series of pulses upon the occurrence of certain events and means to step the series of pulses as preset numbers of the events occur.

For a better understanding of the invention as well as other objects and further features thereof, reference is had to the following detailed description of the invention to be read in connection with the accompanying drawings, wherein.

Figure 1:
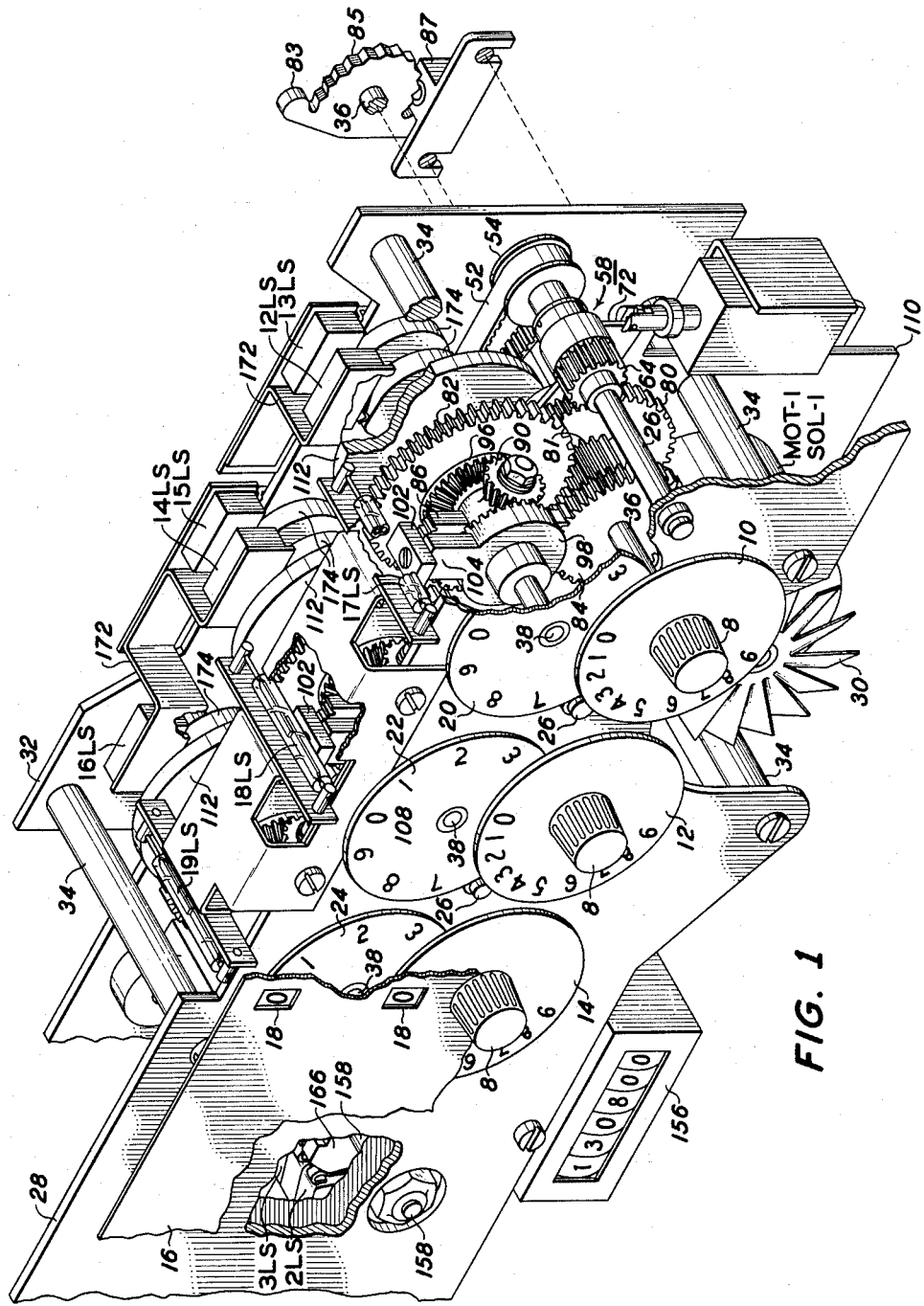
FIG. 1 is a front right side perspective view of apparatus embodying the present invention with portions broken away to show internal structure.
Figure 3:
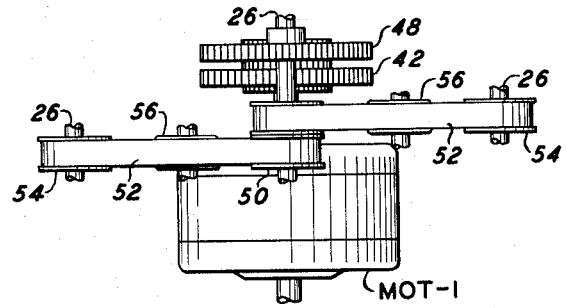
FIG. 3 is a top schematic view of the drive system shown in FIG. 2.

FIGURE 1 shows a preferred embodiment of a control computer or programmer, constructed in accordance with the present invention. There are three sets of dials, two dials per set, on the front of the programmer representing, from right to left, numerical designations of units, tens and hundreds. The bottom row of dials are manually adjustable by knobs 8 to the desired number of cycles to be counted. The upper dials are counters that record the number of cycles counted during operation. In this specification, for purposes of clarity, the top row of dials is referred to as counters and the bottom row as dials. The units dial 10 is manually set by the operator to indicate the number of cycles to be counted between 0 and 9. If the number of cycles to be counted exceeds 9, then the dial 12 is set to indicate the tens digit and the dial 14 is set to indicate the hundreds digit, so that if 235 cycles were to be counted, then the dial 14 would be set at 2; the dial 12 at 3; and the dial 10 at 5. A cover plate 16 has small openings 18 at each of the dials and counters, so that the numbers set or indicated shows up in the opening for a visible reading thereof. After each cycle the units counter 20 indexes one position so that the 1 would show up in the opening 18, and the counter 20 continues to index through nine cycles. At the tenth cycle the tens counter 22 indexes one position and continues to index for each ten cycles. The hundreds counter 24 indexes one position for each 100 cycles of operation.

The dials and counters are mounted on separate shafts and have a clutch shaft 26 associated therewith. The dial shaft, counter shaft, clutch shaft and the associated mechanisms for each of the units tens and hundreds dials will be referred to herein as a grouping. The mechanisms associated with each shaft are substantially the same for each grouping. Therefore, for simplicity of illustration one grouping has been shown in FIG. 1 by breaking away a portion of the frame plate 28. Any minor differences in construction or operation between the groups are specifically pointed out.

A drive motor MOT-1, having a cooling fan 30 on the front thereof, is mounted between the front frame plate 28 and a rear frame plate 32 on an intermediate frame plate 110. The frame plates 28 and 32 are spaced apart by tie rods 34 and provide journals for the clutch shafts 26, the dial shafts 36 and the counter shafts 38. The intermediate frame plate 110 is supported by the tie rods 34 between the front and rear frame plates.

Figure 2:
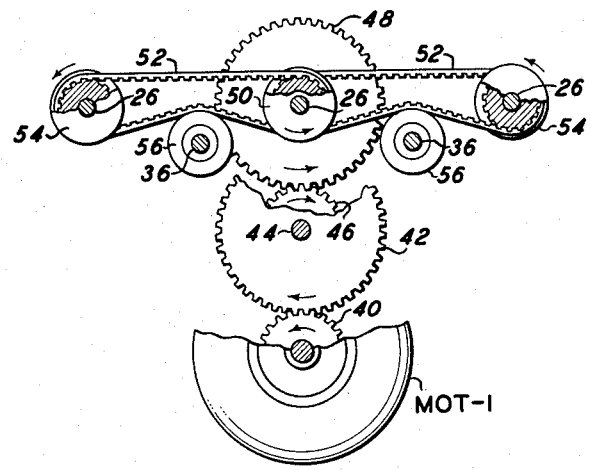
FIG. 2 is a rear schematic view of the drive system of the apparatus shown in FIG. 1.

A pinion 40 on the drive shaft of motor MOT-1, as seen in FIG. 2, drives a gear 42 mounted on a stub shaft 44. A pinion 46 on the stub shaft 44 drives a gear 48 secured to the clutch shaft 26 associated with the tens grouping of shafts. A pair of timing belt sprockets 50 mounted on the center clutch shaft 26, drives timing belts 52 which extend around sprockets 54 on the other two clutch shafts 26. A pair of tension rollers 56 are mounted on a pair of stub shafts in contact with the surface of the belts 52 to provide proper tensioning of the belts. Rotational movement of each of the clutch shafts 26 is provided by the motor MOT-1 through the gear train and timing belts described above. The clutch shafts 26 are continuously rotating during operation of the apparatus.

Figure 5:
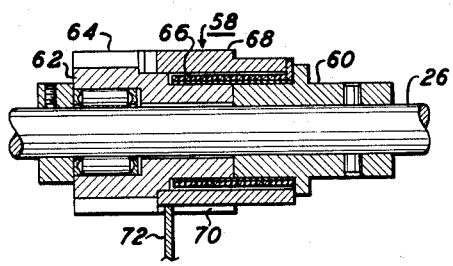
FIG. 5 is a sectional view of the single revolution clutch taken along lines 5—5 of FIG. 4.
Figure 4:
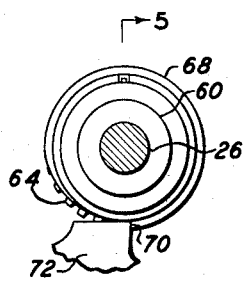
FIG. 4 is a rear view of the single revolution clutch shown in FIG. 1.

Each of the clutch shafts 26 has a single revolution clutch 58 mounted thereon. The clutch, shown in cross section in FIG. 5, consists of a clutch drum 60 secured to shaft 26, a drum 62, with a pinion gear 64 secured thereto, freely rotatable on the shaft 26 and a torsion spring 66 about drums 60 and 62. An actuating sleeve 68 fits around the spring 66 and contacts one end thereof to provide the necessary restraint to the spring to disengage the clutch drums. The spring 66 has an internal diameter such that unrestrained it grips both drums 60 and 62 and imparts rotational movement from drum 60 to drum 62. If the end of the spring 66 is restrained in its movement, the internal diameter of the spring expands releasing the force between the spring and clutch drums allowing separate rotation of the drum 60 from the drum 62. The sleeve 68 has a notched surface 70 which is engaged and restrained by a pawl 72 which is operated from a count solenoid SOL-1. The solenoid SOL-1 momentarily withdraws the pawl 72 from the notch 70, and the spring 66 is allowed to engage the drums 60 and 62 to provide driving force to the gear 64. At the end of one rotation the notch 70 encounters the pawl 72 and releases the clutch 58 from driving engagement. A clutch 58 on each of the shafts 26 functions in the same manner as the clutch described above, except that the sleeve 68 is not restrained by the pawl 72 on a solenoid but rather by a pawl 74, FIG. 6, on pivot arms 76. The pawls 74 are actuated by rotating cams 78 rather than a solenoid. One cam 78 is mounted on the shaft 38 of the units grouping and actuates the pivot arm 76 of the tens grouping so that rotational movement is applied to the gear 64 on the shaft 26 of the tens grouping by the clutch 58 at the appropriate time. Likewise, a cam 78 on the shaft 38 of the tens grouping actuates the pivot arm 76 of the hundreds grouping to provide rotational movement to the gear 64 in the hundreds grouping. The apparatus may be extended to include additional groupings for larger counts by actuating the new grouping with a cam on the hundreds grouping.

Pulses received by the apparatus actuate the count solenoid SOL-1 to provide one cycle of rotation to the clutch shaft 26 of the units grouping. For each ten rotations of the shaft 26 in the units grouping, the cam 78 actuates the pivot arm 76 on the tens grouping and permits one revolution of the clutch 58 and the gear 38 in the tens grouping. Ten rotations of the clutch shaft 26 in the tens grouping or 100 rotations of the clutch shaft in the units grouping rotates the cam 78 of the tens grouping a distance sufficient to actuate the pivot arm 76 of the hundreds grouping and permit a single revolution of the clutch 58 and the shaft 26 of the hundreds grouping.

The pinions 64 on the clutch shafts mesh with gears 80 freely journaled on the shafts 36. One revolution of the pinion 64 advances the gear 80 a proportional distance and the gear 80 through step gear 81 advances 82 secured to shaft 38 one tenth of a revolution. Therefore, one revolution of the pinion 64 produces one tenth of a revolution advancement of the gear 82 which in turn rotates the shaft 38 and the counter 20 one unit. It can be seen that each pulse to the solenoid SOL-1 advances the counter 20 one unit. Thus, a pulse is sent from the auxiliary apparatus; on each cycle of that apparatus the counter will record the number of cycles operated.

Figure 7:
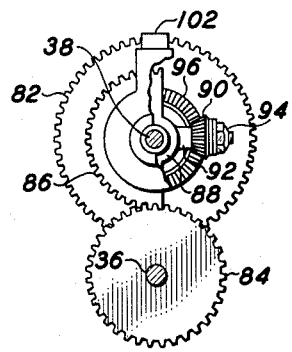
FIG. 7 is a front view of the count mechanism of the apparatus shown in FIG. 1 with portions broken away to show internal structure.

Referring to FIGURES 1 and 7, it can be seen that the dial shaft 36 contains a gear 84 secured thereto which is rotated upon setting of the dial 10 by turning the knob 8. Movement of shaft 36 is limited in both directions by a pair of tabs 83 on a detent plate 85. The tabs 83 encounter a step 87 during rotation of shaft 36. The step 87 contains a spring-loaded ball positioned to function with the detents in detent plate 85 to hold the dial 10 at each position indicated thereon. The gear 84 meshes with a segmented gear 86 mounted on a hub 88 journaled on the counter shaft 38. A beveled gear 90 is rotatably mounted on an arm 92 extending outward from the hub 88. The beveled gear 90 is held on the arm 92 by a nut 94 and is positioned to mesh with a beveled gear 96 on the face of the gear 82 and a beveled gear 98 journaled on the shaft 38. The gear 90 is rotated by the beveled gear 96 when the segmented gear 86 and the hub are rotated. Movement of the gear 98 is produced about shaft 38 counter to the direction of movement of the segmented gear 86. Presetting of the dial 10 by rotational movement of the knob 8 produces rotational movement of the gear 84 and the segmented gear 86. The movement of the gear 86 positions the beveled gear 90 which in turn counter rotates the beveled gear 98 a distance proportional to the setting on the dial 10. The purpose of the counter rotational movement of the beveled gear 98 is to position a magnet 102 mounted on an arm 104 extending outward from the beveled gear 98. The magnets 102 on each of the groupings are used to actuate reed switches 17LS, 18LS and 19LS, mounted on bracket 108 secured to the front frame 28. When a number is set on the dial 10 the magnet 102 is moved away from the reed switch 17LS allowing the reed switch to open. As the solenoid SOL-1 is actuated, the single revolution clutch 58 drives gear 64 which in turn drives the gear 82 through gears 80 and 81 one tenth of a revolution. Movement of the gear 82 and the beveled gear 96 on the face of gear 82 produces rotational movement of the beveled gear 90 which in turn advances the gear 98 a distance proportional to one unit on the counter dial 20. The movement of the gear 98 advances the magnet 102 one unit closer to the reed switch 16LS. When the number of advances of the magnet 102 corresponds to the number preset on the dial 10, the magnet is aligned directly under the reed switch 17LS causing the reed switch to close. The movement of the gear 82 which is secured to the shaft 38 also produces rotation of the dial 20 so that the number of cycles of operation is indicated on the face of the dial. Thus, with the counter 20 set at zero and the preset dial 10 moved to the two position, the magnet 102 is two units away from the reed switch 17LS. The reed switch 17LS is opened and after two actuations of the solenoid SOL-1 the magnet 102 is again aligned with the reed switch 17LS closing the switch. The counter dial 20 will have advanced two units to indicate two in the opening 18 on the plate 16.

Figure 6:
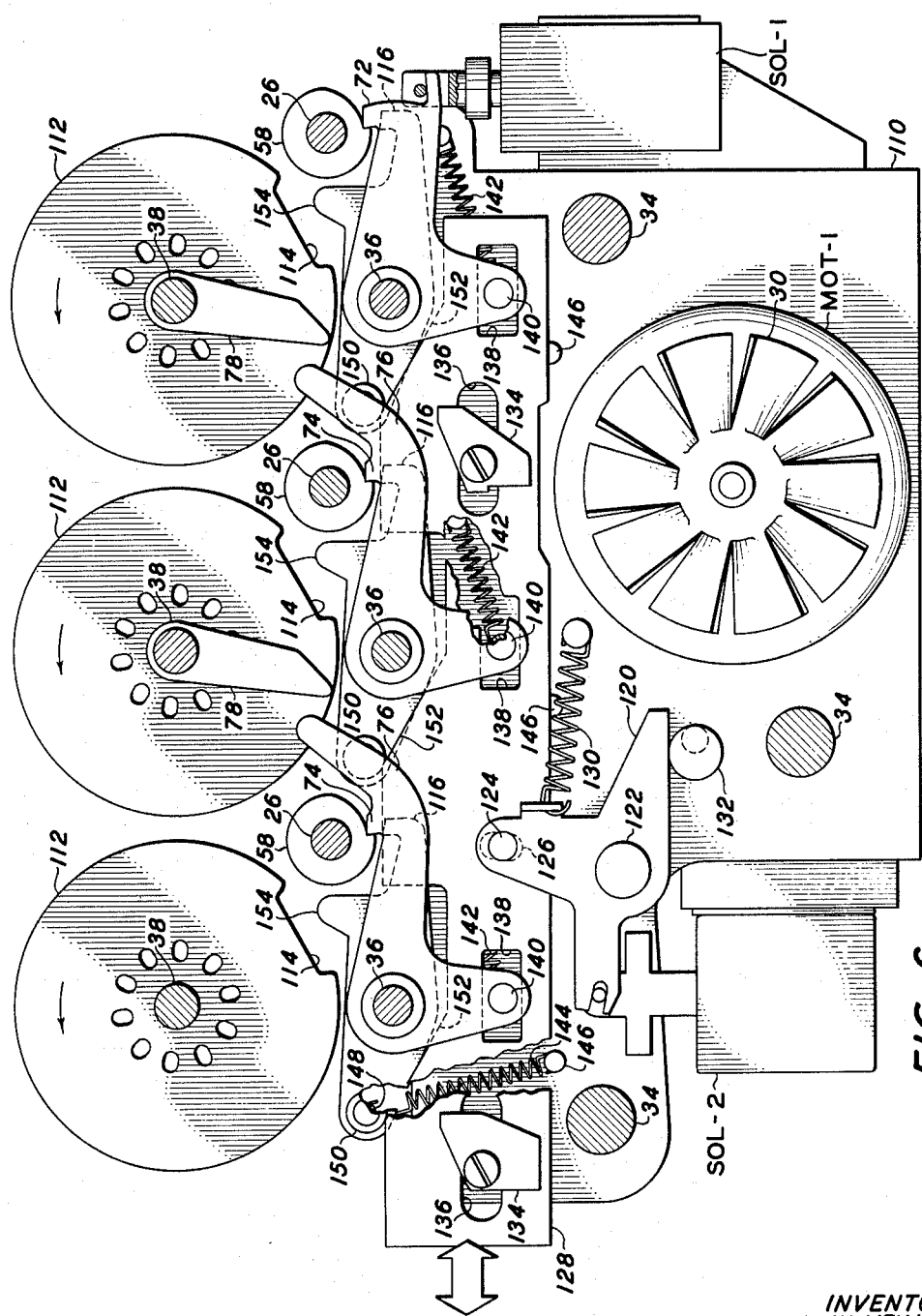
FIG. 6 is a front view of the reset mechanism of the apparatus shown in FIG. 1.

As previously stated, the construction and operation of the apparatus in the units mechanism is essentially the same as that in the tens mechanism and the hundreds mechanism with the exception that the clutch 58 is operated by the solenoid SOL-1 in the units mechanism and by the pawls 74 and pivot arms 76 in the tens and hundreds mechanism. When a number of cycles to be counted has been set on the dials 10, 12 and 14 and the solenoid SOL-1 has been pulsed a number of times equal to that preset number, then the magnets 102 in each of the units, tens and hundreds mechanism are aligned directly under the reed switches 17LS, 18LS and 19LS and the counters 20, 22 and 24 indicate the same number as the preset number. When this situation occurs, the closing of the three switches actuates a relay 7CR as seen in the wiring diagram FIG. 11, which in turn actuates a timer 2TR. The timer 2TR is used to control various operations of the auxiliary apparatus and to reset the programmer to a position wherein it is ready to receive another set of numbers to be programmed and counted. The timer 2TR closes a set of contacts 2TR-1 which energize a reset solenoid SOL-2. The reset mechanism is seen in FIG. 6 and is mounted on the intermediate frame member 110.

A locking disc 112 is mounted on each of the counter shafts 38 and in the case of the units and tens groupings the locking disc is integrally formed with the cams 78. The locking disc 112 has a notch 114 in the periphery which when in the proper position permits movement, a second reset pawl 116 which engages the notch 70 on the sleeve 68 of clutches 58 and stops movement of the dials and counters at the zero position. The locking disc 112 prevents the pawl 116 from engaging the clutch 58 at any position other than the zero setting on the counter.

The reset solenoid SOL-2 actuates a reset lever 120 which is pivoted on a shaft 122 and contains a pin 124 extending through a slot 126 in a reset bar 128. The reset lever 120 is urged to an inoperative position by a spring 130 secured at one end to the intermediate frame plate 110. The spring 130 holds the lever 120 and the reset bar 128 in an inoperative position until the solenoid SOL-2 is actuated. Movement of the lever 120 is limited in the inoperative direction by a stop 132 mounted on the intermediate frame 110.

Movement of the reset bar 128 is limited to the horizontal direction by a pair of guide rollers mounted on the intermediate plate 110 and extending thtrough a pair of slots 136 in the reset bar. The reset bar is held in position by guides 134 fastened to the end of the guide rollers. The reset bar 128 also has a horizontal slot 138 for each of the units, tens and hundreds groupings which accommodates a pin 140 in an arm of the count pawls 72 and 74.

The count pawls 72 and 74 are pivoted about the dial shafts 36 and are urged into engagement with the clutches 58 by tension springs 142. When the reset bar 128 moves towards the left, as seen in FIG. 6, the edge of the slot 138 engages the pin 140 and pivots the pawls 72 and 74 about shafts 36 away from the clutch mechanisms 58. The reset pawls 116 for each of the mechanisms is biased about shaft 36 by means of spring 144. The spring 144 is connected between pins 146 on the intermediate frame 110 and pins 148 on the pawls 116 so that the pawls 116 are biased towards engagement with the clutch mechanisms 58. Rollers 150 on the pawls 116 rest on the top of the reset bar 128. The pawls 116 are held away from the clutch 58 by the reset bar and do not function relative to the clutch 58 during the normal count cycle. However, when the solenoid SOL-2 is actuated to reset the dials and counters, the bar 128 moves to the left and the rollers 150 are in a position to move down inclined surfaces 152 of the reset bar. The springs 144 urge the rollers to remain in contact with the inclined surfaces 152 so that the pawl mechanism would move up into contact with the clutch 58. However, during operation of the count cycle the counter shafts 38 have rotated, rotating the locking discs 112 so that the periphery of the locking discs are in interference relationship with protruding arms 154 on the pawls. The arms 154 ride on the surface of the locking discs 112 until the notches 114 coincides with the position of the arm 154 at which time, the spring 144 urges the pawls 116 into contact with the clutch 58 stopping the movement of the shaft 38 at the zero position of the counter.

Figure 11:
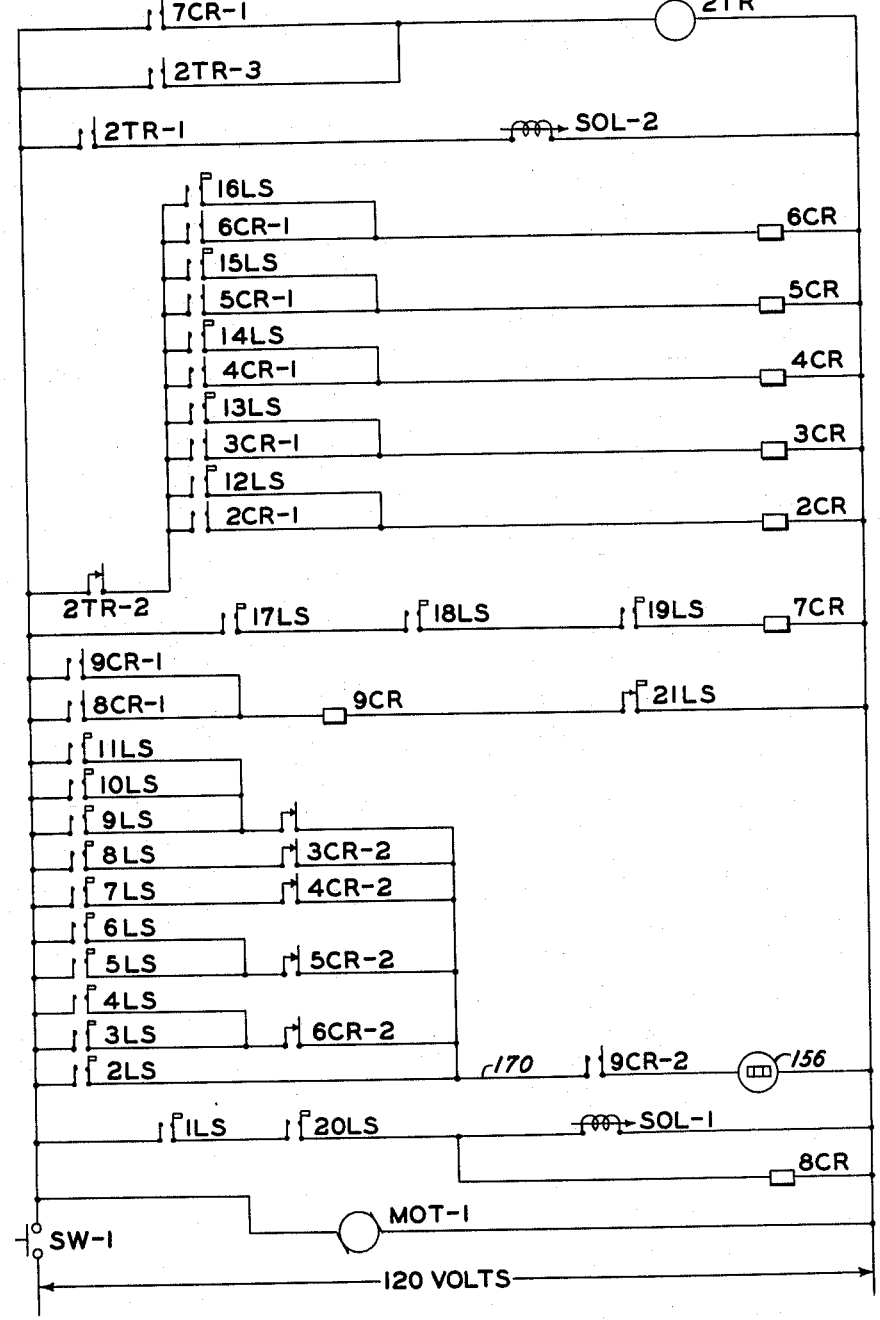
FIG. 11 is a schematic wiring diagram of the apparatus shown in FIG. 1.

In operation of the apparatus a switch SW-1, as seen in the schematic wiring diagram FIG. 11, is closed energizing the entire circuit from a 120 volt source. The switch SW-1 is normally located on associated apparatus with which the counter is intended to operate, so that when the associated apparatus is operative the counter is also energized and ready to operate. Closing of the switch SW-1 energizes the motor MOT-1 which in turn continuously drives the clutch shafts 26. A switch 1LS is also located in a position in the associated apparatus to be actuated on each cycle of operation of the apparatus. For example, in a document reproducing apparatus, the switch 1LS would be located in interference relationship to the path of movement of the sheet feeding system, so that each time a sheet was fed to the apparatus, the switch 1LS momentarily energized count solenoid SOL-1 releasing the clutch 58 of the units grouping.

Since the switch 1LS is actuated by a sheet of paper the length of time that it is closed would be greater than one revolution of the clutch 58. To insure that count solenoid SOL-1 is only pulsed and not maintained in an actuated position for a length of time greater than one revolution of clutch 58, a second normally open pulsing switch 20LS is placed in the circuit to the solenoid SOL-1. The switch 20LS is located adjacent a shaft 158 and is actuated by a cam 166 described below. The cam 166 closes the switch 20LS for a period of time less than one revolution of clutch 58 during the time that switch 1LS is closed thereby pulsing the solenoid SOL-1.

Each cycle of operation of the associated equipment produces a pulse of a solenoid SOL-1 which in turn is indicated on the counter dials 20, 22 and 24. A standard electrical counter of the type which displays a numerical indication of the number of electrical pulses transmitted to the indicator is designated generally as 156. The function of the indicator 156 is to record and display a numerical indication of the number of cycles operated by the associated apparatus with the numerical indication weighted according to the cycles run. For example, the first two copies may be indicated as 10 units, the next copy as 8 units, and so on until all copies over a given number are indicated as one unit. The ratio of the units of the first copy to the units of the last copy may be varied, and the points at which the units per copy changes may be varied as described below. Then by establishing a price per unit on the indicator 156 rather than a price per copy, the actual cost per copy is stepped dependent on the number of copies made.

Figure 9:
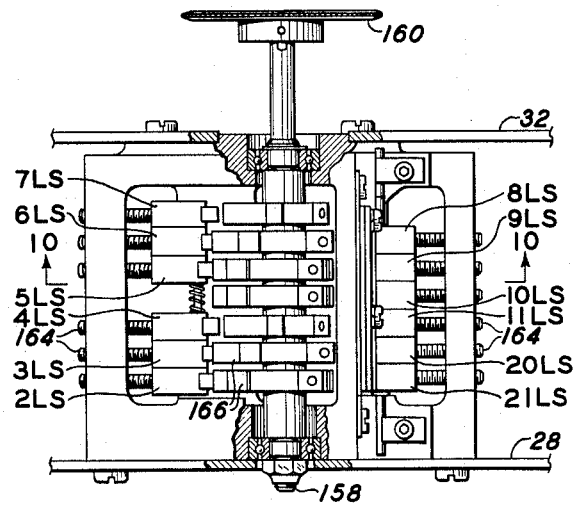
FIG. 9 is a top view of the pulse switches and cams of the apparatus shown in FIG. 1.
Figure 10:
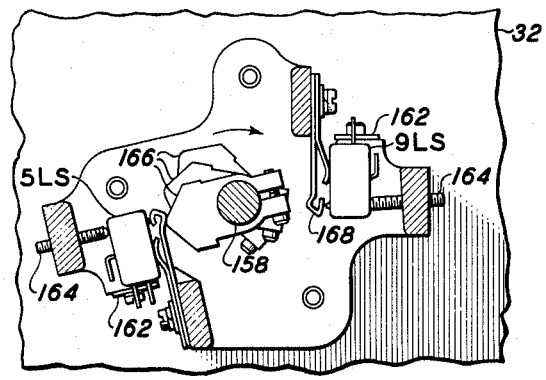
FIG. 10 is a sectional view of the pulse switches and cams taken along line 10—10 of FIG. 9.
Figure 8:
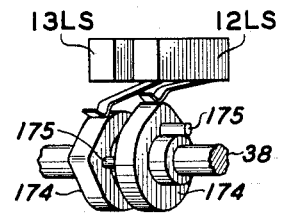
FIG. 8 is a perspective view of the breakpoint switches and cam of the apparatus shown in FIG. 1.

As seen in the wiring diagram of FIG. 11, a series of limiting switches, 2LS through 11LS, are connected in parallel to each other and in series with the indicator 156. The switches 2LS through 11LS are normally open switches and are sequentially closed on each cycle of the associated apparatus or the occurrence of an event. FIGURES 9 and 10 show an arrangement of the switches 2LS through 11LS mounted about a shaft 158 which would be either incorporated in the associated apparatus or, as shown in FIG. 1, mounted in the programmer and to be driven either from the associated apparatus by means of sprocket 160, or from a separate drive in the programmer. In the latter case, a single revolution clutch similar to clutch 58 would be used on shaft 158 and driven by a timing belt and pulley from motor MOT-1.

The switches 2LS through 11LS are mounted on rods and clamped in place by brackets 162 and are positionable by means of set screws 164. The switches are actuated by a series of cams 166 mounted on a shaft 158 and contacting actuating arms 168 as the shaft 158 rotates. The cams 166 are staggered about the shaft 158 so that each of the switches 2LS through 11LS is actuated individually in timed sequence. As shown herein, there are five cams 166 and five of the switches are located on one side of the shaft 158 and five of the switches are located on the other side of the shaft 158 so that each cam 166 actuates two switches. It is obvious, therefore, that the cams 166 should be staggered about 180 degrees of the shaft 158. The number of switches used to provide pulses to the indicator is dependent upon the number of pulses per cycle that is desired, in this case the first cycle in a run on the auxiliary apparatus would pulse the indicator ten times; that is, once for each switch 2LS through 11LS. The pulses to the indicator 156 for subsequent cycles may be varied depending upon the position of limit switches located on the counter as described below. For the first operating cycle in each run of the associated apparatus, the pulse from limit switch 2LS goes directly to the indicator 156 through line 170. The subsequent pulses from switches 3LS through 11LS pass through either of the normally closed contacts 2CR–2 through 6CR–2 to line 170 to the indicator 156. Contacts 2CR–2 through 6CR–2 may be positioned to copy the pulses to the indicator depending upon the number of pulses assigned to each cycle of operation.

In the case where the shaft 158 is continuously rotated, the pulses to indicator 156 from the switches 2LS through 11LS must be limited to the revolution of shaft 158 that occurs only when a particular event is occurring. In the case of a copying machine, it would be when a sheet of paper is fed in the associated apparatus. To insure that pulses are not received by indicator 156 for every revolution of shaft 158 a set of normally open relay contacts 9CR–2 are included in the circuit to indicator 156. A relay 8CR is energized when the count solenoid SOL-1 is actuated, closing 8CR-1 which energizes relay 9CR. Relay 9CR closes contacts 9CR–1 providing a holding circuit for relay 9CR and closes contacts 9CR–2 to the indicator 156. A normally closed limit switch 21LS located adjacent the shaft 158 is actuated by cam 166 to relay 9CR and open contacts 9CR–2 after one revolution of the shaft 158, so that further pulses from switches 2LS through 11LS do not register on indicator 156.

A series of breakpoint switches 12LS through 16LS are physically located on brackets 172 and rear frame plate 32 above the counter shafts 38. The switches 12LS through 16LS are actuated by cams 174 adjustable mounted on the shafts 38 in a position to actuate the switches at the termination of predetermined cycles counted by the apparatus. The cams 174 contain pins 175 which mate with corresponding holes in adjacent cams and in locking discs 112. The pins may be seated in different holes to change the position of the cams on the shaft.

In the preferred embodiment shown in the drawings, five limit switches and corresponding cams have been shown to illustrate the degree of flexibility obtainable with the apparatus. Obviously, more or less switches may be used as desired, or necessary, for the particular application. With two switches arranged in conjunction with the units mechanism, these may be two breakpoints between 0 and 10; with two switches on the tens mechanism there may be two breakpoints between 10 and 100; and the one switch on the hundreds mechanism allows one breakpoint above 100. It is not necessary that there be breakpoint switches associated with any of the mechanisms. The location of the breakpoints is entirely discretionary. In usual practice the number of breakpoints would usually be on the magnitude of three.

The actual breakpoints are determined by adjusting the cams 74 on shafts 38 so that the breakpoint switches are actuated after the desired number of cycles or events have been counted.

As seen in the wiring diagram, FIG. 11, actuation of the limit switches 12LS through 16LS by the cams 74 energizes its respective relay 2CR through 6CR. The contacts 2CR–1, 3CR–1, 4CR–1, 5CR–1 and 6CR–1 are closed to provide a holding circuit when the corresponding relay 2CR to 6CR is energized. Therefore, once the corresponding relay 2CR through 6CR is energized by the limit switches 12LS through 16LS, the contacts corresponding to those relays will remain in an actuated position after the cam 74 releases the limit switch. The normally closed contacts 2CR–2, 3CR–2, 4CR–2, 5CR–2 and 6CR–2 of the relays 2CR through 6CR located in the circuitry to the indicator 156 are opened upon energization of its corresponding relay by the breakpoint switches. For example, if the breakpoint switch 12LS is set to actuate after three cycles of the auxiliary apparatus, that is, after the counter has been actuated three times, the relay 2CR opens the normally closed contacts 2CR–2 so that the pulses from the switches 9LS, 10LS and 11LS do not pulse the indicator 156 on further cycles. When the breakpoint switch 13LS is actuated, the relay 3CR opens the normally closed contacts 3CR–2 so that the pulse from the switch 8LS does not register on the indicator 156. This procedure is followed as each of the breakpoint switches is actuated until the last breakpoint switch 16LS energizes relay 6CR opening normally closed contacts 6CR–2. At this point, the only pulse to the indicator 156 on each cycle of operation is that received from the switch 2LS. As pointed out above, the location of the breakpoint switches 12LS through 16LS may be varied to change the relative indication of each of the cycles counted or run on the associated apparatus. Also, the location of the contacts 2CR–2 through 6CR–2 may be varied in the circuitry to the indicator 156 so that the number of pulses to the indicator 156 may be varied for the second cycle or any subsequent cycle thereafter. For example, if the last contact 6CR–2 were connected to the circuit containing limit switch 4LS rather than 3LS, then all subsequent cycles of the auxiliary apparatus after the last breakpoint switch has been actuated would pulse the indicator 156 twice rather than once. The ratio of the number of pulses has been indicated herein as ten to one; that is, there are ten limit switches sending pulses to the indicator 156 so that the ratio of the maximum indicator reading to the minimum reading for each cycle of operation can be on the order of ten to one. This number may be varied as desired by changing the circuitry to the indicator 156 and by adding additional pulsing switches about the shaft 158.

The reed switches 17LS, 18LS and 19LS are located in series in a circuit to relay 7CR. When the magnets 102 close the contacts of the switches 17LS through 19LS, the counter has reached the preset number in the dials 10, 12 and 14. Closing of these switches energizes the relay 7CR which closes its normally open contacts 7CR–1 in the circuit to a timer 2TR. This timer 2TR is used herein to indicate apparatus which can be used to reset the counter and to provide pulses which may be used to control the associated apparatus. For example, it may be desirable to shut off the associated apparatus in response to the counter, in which case a pulse from the timer 2TR would be used to actuate a shut-down switch in the associated apparatus. The timer may send multiple pulses to the associated apparatus so that it can be shut down in a timed sequence. As shown in the schematic wiring diagram, the timer 2TR resets the counter by closing its normally opened contacts 2TR-1 in the circuit to the reset solenoid SOL-2, thereby initiating operation of the reset mechanism as described above. Normally closed contacts 2TR-2 in the circuit to the breakpoint switches 12LS through 16LS are opened, thereby releasing the holding circuits to the relays 2CR through 6CR and permitting the relays to revert to a position wherein a new cycle may be operated. Also, normally open contacts 2TR-3 are closed providing a holding circuit for timer 2TR so that the various functions of the timer may be carried out to the point wherein the timer automatically releases its own holding circuit and the apparatus is ready for the next run or set of cycles.

While the invention has been described with reference to the structure disclosed herein, it is not confined to the details set forth, and this application is intended to cover such modifications or changes as may come within the purposes of the improvements or the scope of the following claims.

What is claimed is:

1. Apparatus for providing varied numbers of pulses upon the occurrence of events including:
   pulse emitting means adapted to emit sequential series of pulses upon the occurrence of predetermined events,
   counting means including means to preset a number of events to occur, means to record the occurrence of events and means to detect the occurrence of the preset number of events and to produce a signal upon the occurrence of the preset number of events,
   and means operatively associated with the counting means to vary the number of pulses from the pulse emitting means as the counting means records different specific numbers of events.

2. A recorder for use in recording the occurrence of events according to a variable rate dependent upon the number of events which have previously occurred, including
   a counter responsive to the occurrence of predetermined events and operative to record the occurrence of events,
   the counter having means to preset a number of events to occur and means to detect the occurrence of the preset number of events and to produce a signal upon the occurrence of the preset number of events,
   pulse responsive indicating means capable of cumulatively indicating the number of pulses received,
   pulse emitting means adapted to emit series of pulses to the indicating means in accordance with the occurrence of events,
   and pulse stepping means actuated by the counter upon the occurrence of specific numbers of events to vary the number of pulses to the indicating means.

3. Recording apparatus for use in recording the occurrence of events in relative numerical values, according to a preset pattern including:
   a numerical indicator capable of cumulatively storing and indicating numbers of pulses received,
   pulse emitting means capable of being actuated by the occurrence of predetermined events to emit a predetermined number of pulses to the indicator,
   stepping means to vary the number of pulses from the pulse emitting means to the indicator in predetermined steps,
   a counter responsive to the occurrence of events positioned to actuate the stepping means after the occurrence of specific numbers of events to thereby vary the pulses to the indicator at the occurrence of such specific numbers of events,
   the counter having means to preset a number of events to occur and means to indicate when the preset number of events has occurred,
   and means to reset the counter and the stepping means when the counter indicates that the preset number of events has occurred.

4. A control computer for use in recording the occurrences of events of associated apparatus in relative numerical values, according to a preset pattern and in controlling the number of events which occur in the associated apparatus including:
   a series of pulsing switches,
   means to actuate the pulsing switches sequentially upon the occurrence of events in the associated apparatus,
   a numerical indicator operatively connected with the pulsing switches to receive pulses emitted thereby and to numerically indicate the number of pulses received,
   stepping switches, operatively connected with the pulsing switches and the indicator to control the number of pulses to the indicator according to a stepped rate,
   a counter adapted to count the occurrence of specific events in a series of events occurring in the associated apparatus,
   means in the counter to sequentially actuate the stepping switches upon the occurrence of predetermined numbers of events thereby stepping the number of pulses received by the indicator for various events in a series of events,
   means to preset the counter with a number of events to occur in a series of events in the associated apparatus,
   and means to signal the associated apparatus when the counter has counted a number of events equal to the number preset in the counter.

5. A control computer for use with machines which are run through preset numbers of cycles that are to be recorded at stepped rates depending on the number of cycles in each run, including:
   a counter adapted to record the number of cycles in each run of a machine and capable of receiving a preset number of cycles for each run of the machine,
   means to actuate the counter one unit per cycle of operation of the machine,
   pulse emitting means adapted to emit pulses sequentially for each cycle of machine operation,
   an indicator responsive to pulses from the pulse emitting means to numerically indicate a cumulative number of pulses received from the pulse emitting means,
   switching means operative to limit the pulses from the pulse emitting means to the indicator,
   means to actuate the switching means when the counter records predetermined numbers of cycles of machine operation,
   and means to signal the machine when the preset number of cycles has been recorded by the counter.

6. The apparatus of claim 5 further including means to reset the counter and the switching means after the preset number of cycles has been recorded by the counter.

References Cited by the Examiner

UNITED STATES PATENTS

| | | | |
|---|---|---|---|
| 2,911,144 | 11/1959 | Lee et al. | 235—61 |
| 3,021,057 | 2/1962 | Placke et al. | 235—61 |
| 3,075,698 | 1/1963 | Fletcher | 235—92 |
| 3,201,037 | 8/1965 | Welland | 235—30 |
| 3,209,997 | 10/1965 | Steadman et al. | 235—30 |

RICHARD B. WILKINSON, *Primary Examiner.*

LEO SMILOW, *Examiner.*

C. G. COVELL, J. G. MURRAY, *Assistant Examiners.*